(12) United States Patent
Nagarkar et al.

(10) Patent No.: US 7,370,164 B1
(45) Date of Patent: May 6, 2008

(54) BACKUP OF VIRTUAL MACHINES FROM THE BASE MACHINE

(75) Inventors: Kuldeep Sureshrao Nagarkar, Pune (IN); Sinh Dang Nguyen, Eden Prairie, MN (US); Ajay Sadashiv Wani, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 219 days.

(21) Appl. No.: 11/386,570

(22) Filed: Mar. 21, 2006

(51) Int. Cl.
*G06F 12/16* (2006.01)
(52) U.S. Cl. ............................ 711/162; 718/1; 707/204
(58) Field of Classification Search ..................... None
See application file for complete search history.

(56) References Cited

U.S. PATENT DOCUMENTS

| | | | | |
|---|---|---|---|---|
| 6,757,778 | B1 * | 6/2004 | van Rietschote | 711/6 |
| 7,093,086 | B1 * | 8/2006 | van Rietschote | 711/161 |
| 7,266,637 | B1 * | 9/2007 | van Rietschote | 711/112 |
| 2004/0010787 | A1 * | 1/2004 | Traut et al. | 718/1 |
| 2006/0184935 | A1 * | 8/2006 | Abels et al. | 718/1 |
| 2006/0184936 | A1 * | 8/2006 | Abels et al. | 718/1 |
| 2006/0184937 | A1 * | 8/2006 | Abels et al. | 718/1 |
| 2006/0225065 | A1 * | 10/2006 | Chandhok et al. | 717/168 |

OTHER PUBLICATIONS

VMware DiskMount Utility. User's Manual. 2005. Palo Alto, CA.
Patel, D. Sotrage File Mapping in Databases. Veritas Architect Network. 2003. Mountain View, CA.

* cited by examiner

*Primary Examiner*—Kevin Verbrugge
(74) *Attorney, Agent, or Firm*—Jeffrey Brill; Glenn Patent Group

(57) ABSTRACT

A backup manager backups file systems of virtual machines running on a base computer. In order to backup a virtual machine, the backup manager identifies the file on the base machine that represents the virtual machine, freezes the virtual machine, and creates a snapshot thereof. The backup manager restarts the frozen machine, and starts the snapshot. The files of the file system of the snapshot are mapped at a virtual machine level, and the resulting file mapping information is used to backup the files of the virtual machine at a base machine level. The mapping information is current as of the instant the snapshot was taken. The backup manager can backup one, multiple or all virtual machine(s) running on the base computer, in conjunction with a full or incremental backup of the base computer, or independently.

20 Claims, 3 Drawing Sheets

BACKUP OF VIRTUAL MACHINES FROM THE BASE MACHINE

TECHNICAL FIELD

This invention pertains generally to backing up computer systems, and more specifically to backing up virtual machines at a base computer level.

BACKGROUND

Consider a computer running one or more virtual machines, using virtualization software such as VMware. The base computer runs an operating system (the baseOS), and the virtualization software (e.g., VMware) runs as an application on the baseOS. An operating system runs in the virtualization environment (a guestOS) in order to form a virtual machine. The applications running in the virtual environment on the guestOS have their data organized in the form of files in the file system of the guestOS. There is a single file in the baseOS file system that houses all the data for the applications running in the guestOS, and the guestOS itself. Any baseOS user or application looking at the file data on the baseOS will not be able to read virtual machine data, as the guestOS file system does not necessarily write file data sequentially within the baseOS file representing a virtual machine. Instead, the data extents of the files in a guestOS are present in a seemingly random sequence in the single file on the baseOS. Therefore, an application on the baseOS cannot reorganize the file data and reconstruct the files in the guestOS environment without the help of the file system on the guestOS.

In order to backup such a system in its entirety, a backup operation is run on the baseOS and on each virtual machine guestOS. This is so because individual files in a virtual machine file system can only be restored if the virtual machine is backed up as separate entity. A full backup of the base computer does back up each baseOS file representing a virtual machine. However, because each virtual machine file system stores blocks non-contiguously such that the baseOS file system does not recognize the different blocks as comprising contiguous data, the backup of the baseOS file system cannot be used to restore individual files to a virtual file system.

The same issues arise with incremental backups of base computers running virtual machines. Incremental backup is typically used to minimize the total backup time, thus providing greater efficiency and decreasing resource costs. However, in the case of a base computer running virtual machines, incremental backups have to done at two levels. When a change occurs on a guestOS, an incremental backup of the base computer backups the file that represents the virtual machine. This backup can be used to restore the guestOS as a whole. When individual files in a guestOS file system change, an incremental backup at a guestOS level backs up those individual files. This allows a restore of the files to the guestOS file system. Thus, incrementally backing up a base computer running virtual machines involves backing up the same data at both a virtual machine level and at a base computer level.

Separately backing up virtual machine file system data at both a virtual machine and base computer level results in lot of work duplication and performance overhead. The data for each virtual machine gets backed up twice: once as a part of the backup of the virtual machine itself when the backup job runs on the guestOS, and again when the file representing the virtual machine is backed up on the baseOS. Additionally, both the baseOS and the guestOS file systems get populated with backup data. More memory, media and processing resources are also required to complete the backup, consequently raising the cost of data protection management. The problem only gets worse as the number of virtual machines running on a base computer increases.

What is needed are methods, computer readable media and computer systems for backing up virtual machines from a baseOS level, for example as part of the backup of the base computer.

SUMMARY OF INVENTION

Computer-implemented methods, computer systems and computer-readable media backup the file systems of virtual machines running on a base computer. In order to backup a virtual machine, a backup manager identifies the file on the base machine that represents the virtual machine, freezes the virtual machine, and creates a snapshot thereof. The backup manager restarts the frozen machine, and starts the snapshot. The files of the file system of the snapshot are mapped at a virtual machine level, and the resulting file mapping information is used to backup the files of the virtual machine at a base machine level. The mapping information is current as of the instant the snapshot was taken. The backup manager can backup one, multiple or all virtual machine(s) running on the base computer, in conjunction with a full or incremental backup of the base computer, or independently.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
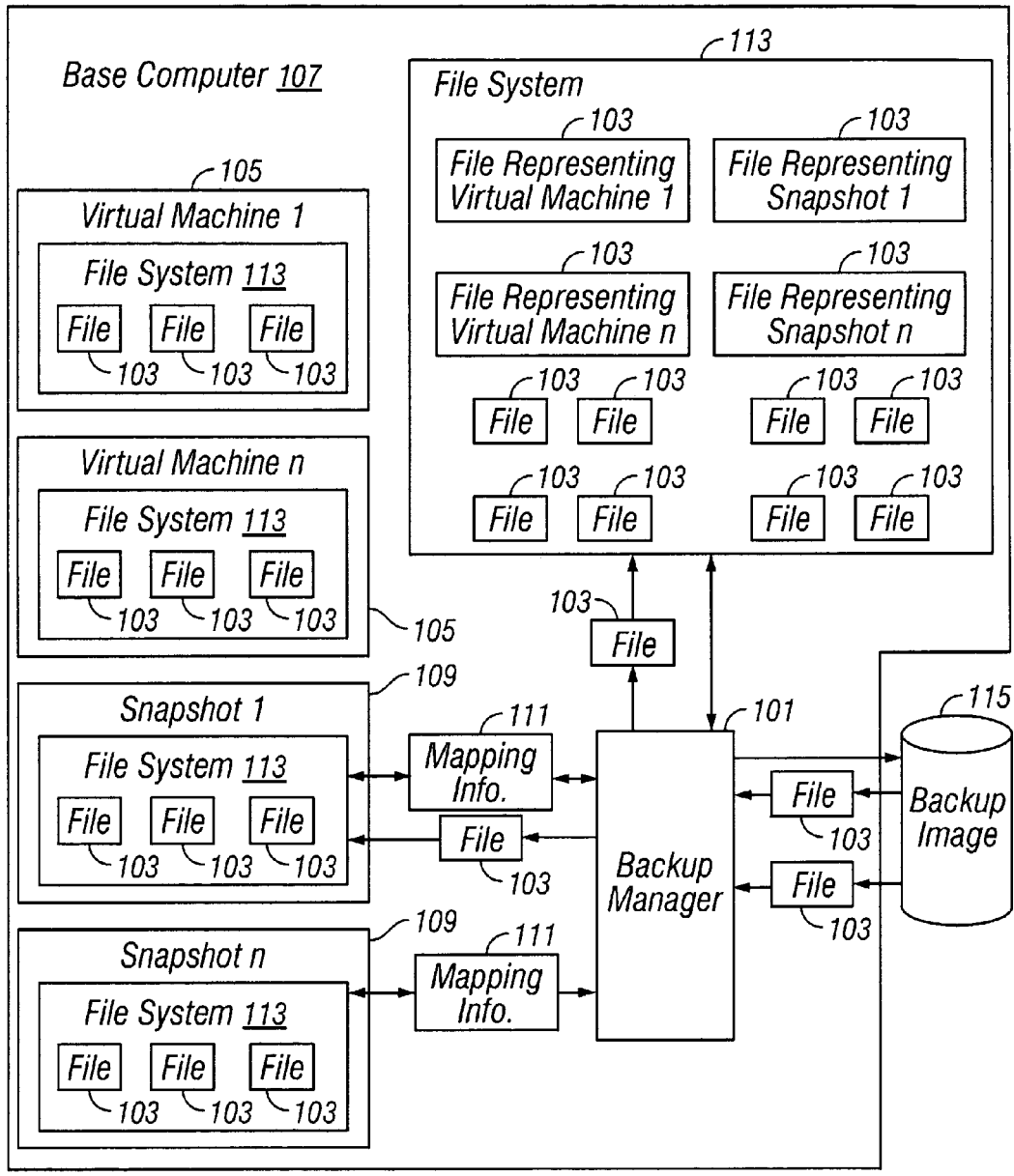
FIG. 1 is a block diagram illustrating a high level overview of a backup manager backing up file systems of virtual machines, according to some embodiments of the present invention.

FIG. 1 illustrates a backup manager 101, according to some embodiments of the present invention. It is to be understood that although the backup manager 101 is illustrated as a single entity, as the term is used herein a backup manager 101 refers to a collection of functionalities which can be implemented as software, hardware, firmware or any combination of these. Where a backup manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the backup manager 101 identifies the files 103 that represent the virtual machines 105 running on a base computer 107. The specific files 103 used by virtualization software to represent virtual machines 105 are known. For example, VMware publishes this information.

The backup manager 101 freezes the virtual machines 101 by using the "suspend" or a similar feature (in VMware this feature is called "suspend;" it may have different names in other software packages). The backup manager 101 then creates a snapshot 109 of the file 103 representing each virtual machine 105. The snapshot 109 can be a simple copy of the file 103 with a changed name and configuration (e.g., changed base VMware configuration), such that the virtual machine 105 represented by the snapshot 109 can be started.

Following is an example procedure for creating a snapshot 109 for a VMware virtual machine 105, according to one embodiment of the present invention. In the following example, the virtual machine is represented by "Virtual 01", and "Virtual 03" represents the created snapshot 109 thereof. This example is for a base machine 107 running the Linux operating system, and includes implementation specific Linux commands. It is to be understood that the following procedure is only an example, and many variations on this procedure will be readily apparent to those of ordinary skill in the relevant art in light of this specification.

1. Create a new directory:
 # cd /var/lib/vmware/Virtual\ Machines
 # mkdir "Virtual 03"
2. Copy the files 103 to the new directory. The following scripting changes filename components as desired, in this case changing the "01" and "03". When using such scripting, it is important to watch the direction of the quotation marks.
 # for F in Virtual\ 01/*>
 >do
 >cp -av "$F" "`echo $F | sed 's/Virtual 01/Virtual 03/g'`"
 >done
3. Change the first of two files 103 that specify the disk images:
 # cd Virtual\ 03
 # vi Virtual\ 03.vmdk
4. Globally change "Virtual 01" to "Virtual 03" by typing:
 :%s/Virtual 01/Virtual 03/g
 Save your changes and exit the editor.
5. Edit the other file 103:
 # vi Virtual\ 03.vmx.
 Globally change "Virtual 01" to "Virtual 03" by typing:
 :%s/Virtual 01/Virtual 03/g
6. Delete the write-lock file, if it exists:
 # rm Virtual\ 03.vmdk.WRITELOCK
7. Edit the file /etc/vmware/vm-list to add the line:
 config "/var/lib/vmware/Virtual Machines/Virtual 03/Virtual 03.vmx" The backup manager 101 can restart the frozen virtual machines 105, once the snapshots 109 have been created.

The backup manager 101 starts the snapshot virtual machines 105, and uses a file mapping methodology to create mapping information 111 for the files 103 of the file systems 113 of the virtual machines 105. Such mapping information 113 typically includes the data extent location for the files 103 on the storage device. In the case of a file system 113 of a virtual machine 105, the storage device is not a physical medium, but instead the file 103 in the file system 113 of the base computer 107 that represents the virtual machine 105. The mapping information 111 reflects the state of the file system 113 at the time the snapshot 109 was taken. Thus, the virtual machine 105 files 103 subsequently backed up are guaranteed to be current as of the instant when the snapshot 109 was taken.

Figure 2:
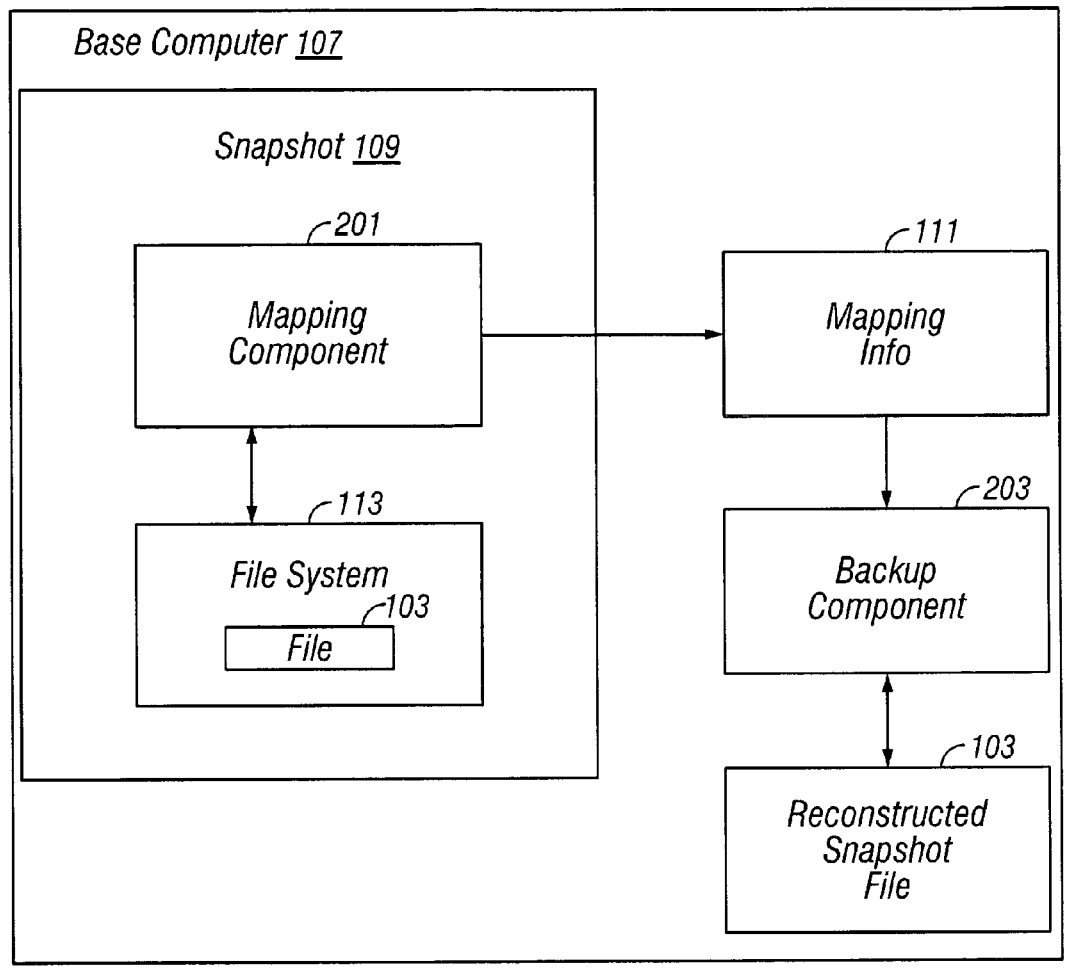
FIG. 2 is a block diagram illustrating mapping file system information at a virtual machine level and backing up the corresponding files at a base computer level, according to some embodiments of the present invention.

As illustrated in FIG. 2, the file system 113 of a virtual machine 105 is mapped at a guestOS level (e.g., by a mapping component 201 of the backup manager 101 running as a process on the virtual computer 105). Thus, the mapping component 201 gleans mapping information 113 concerning the locations of the files 103 of the file system 113 of the virtual machine 105 on their storage medium, which in this case is the single file 103 in the file system 113 of the base computer 107 that represents the virtual machine.

The mapping information 113 is communicated to a baseOS component of the backup manager 101 (e.g., a backup component 203 running as a process of the base computer 107). This communication can be executed via network protocol. Note that the mapping information 113 is very small compared to the actual files 103. Additionally, as the transfer occurs between the guestOS and the baseOS on the same physical base computer 107, there is no actual traffic on the external network. Once the mapping information 113 has been gleaned and transmitted, the snapshot 109 can be shutdown.

Techniques for file mapping are known to those of ordinary skill in the relevant art, and the implementation mechanics for file mapping within the context of the current invention will be readily apparent to those of ordinary skill in the relevant art, in light of this specification.

Returning to FIG. 1, the backup manager 101 uses the mapping information 113 to reorganize the data representing the files 103 of each virtual machine 105 at a base machine 107 level. For example, the backup manager 101 can use the mapping information 113 to reconstruct the files 103 of a virtual machine 105, e.g., in the memory of the base machine 107. The backup manager 101 then backs up the files 103 of virtual machines 105 at a base machine 105 level.

It is to be understood that the backup manager can use the above described methodology to backup one, multiple or all virtual machine(s) 105 running on the base computer 107, in conjunction with a full or partial backup of the base computer 107, or independently.

In different embodiments of the present invention, the backup manager 101 backs up file systems 113 of virtual machines 105 that are implemented by various virtual machine packages having the "freeze", "snapshot" and "resume" capabilities. VMware is just an example.

After backing up one or more virtual machines 105 as described above, the backup manager 101 can restore individual files 103 to virtual machine file systems 113 from the backup image 115. Of course, the backup manager 101 can also restore files 103 to the baseOS file system 113 from the same backup image 115.

Figure 3:
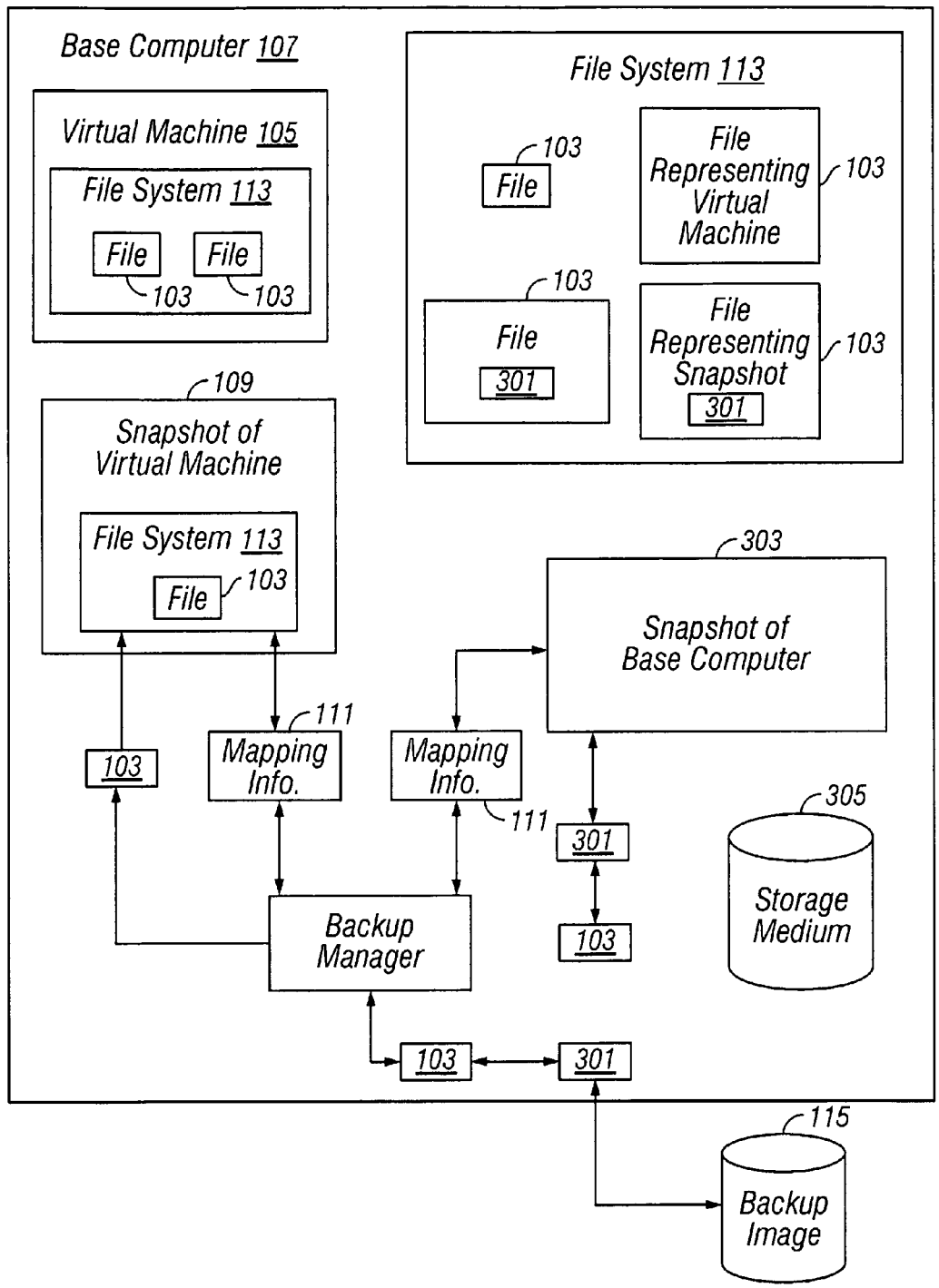
FIG. 3 is a block diagram illustrating the execution of an incremental backup, according to some embodiments of the present invention.

Turning now to FIG. 3, the execution of an incremental backup is illustrated, according to some embodiments of the present invention. Before performing an incremental backup, a full backup is first performed. Subsequent incremental backups only backup changed blocks 301. To perform the initial full backup of the base computer 107, the backup manager 101 creates a snapshot 303 of the base computer file system 113, including the files 103 therein that represent virtual machines 105. Methodologies for making a snapshot 303 of a file system 113 are known to those of ordinary skill in the relevant art, and the implementation mechanics thereof within the context of the present invention will be readily apparent to those of such a skill level in light of this specification. In some embodiments of the present invention, the backup manager 101 creates the snapshot 303 by using known storage technology that can help to track changed blocks 301. The backup manager 101 then maps the files 103 in the snapshot 303 to their locations on the storage medium 305, and also maps the files 103 of each virtual machine file system 113, as described above.

The backup manager 101 then performs a full backup of the base computer 107, including the files 103 therein that represent virtual machines 105. Although only base computer 107 files 103 are backed up, the backup manager 101 can subsequently restore any file 103 of either the base computer's file system 113 or a virtual machine's file system 113, by using the mapping information 113.

A subsequent incremental backup of the base computer 107 involves backing up the changed blocks 301 for all files, including any guestOS file 103. At the next incremental backup instant, the backup manager 101 maps all the files 103 in the hostOS and each guestOS, as described above. The backup manager 101 then backs up all changed blocks 301 in the hostOS file system 113, including any changed blocks 301 of the files 103 that represent virtual machines 105. Although only the incremental changes to hostOS files 103 are backed up, the mapping information 113 can be used to subsequently restore any file 103 in the hostOS file system 113 or any guestOS file system 113.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for backing up virtual machines running on a base computer, the method comprising the steps of:

freezing at least one virtual machine running on the base computer;

creating a snapshot of at least one file representing at least one frozen virtual machine;

starting at least one snapshot of at least one virtual machine;

mapping files of at least one snapshot of at least one virtual machine; and using file mapping information to backup the files of at least one virtual machine.

2. The method of claim 1 wherein:

the steps of claim 1 are performed for each virtual machine running on the base computer.

3. The method of claim 2 further comprising:

backing up files of the base computer.

4. The method of claim 1 further comprising:

identifying at least one file that represents at least one virtual machine running on the base computer.

5. The method of claim 1 wherein the mapping step is performed at a virtual machine level and the backing up step is performed at a base computer level, the method further comprising:

communicating file mapping information from at least one mapping component running at a virtual machine level to a backup component running at a base computer level.

6. The method of claim 1 wherein using file mapping information to backup the files of at least one virtual machine further comprises:

using file mapping information to reconstruct the files of at least one virtual machine at a base machine level; and backing up the reconstructed files.

7. The method of claim 1 further comprising:

subsequently restoring at least one file of at least one virtual machine.

8. A computer implemented method for incrementally backing up virtual machines running on a base computer, the method comprising the steps of:

freezing all virtual machines running on the base computer;

creating a snapshot of each file representing a frozen virtual machine;

starting the snapshot of each virtual machine;

mapping files of the snapshot of each virtual machine;

creating a snapshot of the files of the base computer, including each file representing a virtual machine;

mapping the files of the snapshot; and backing up blocks of files of the base computer that have changed since a last full backup of the base computer, including changed blocks of any file that represents a virtual machine running on the base computer.

9. The method of claim 8 further comprising:

subsequently using file mapping information to restore at least one file of at least one virtual machine.

10. The method of claim 8 further comprising performing the following steps prior to backing up blocks of files of the base computer that have changed since a last full backup of the base computer:

freezing all virtual machines running on the base computer;

creating a snapshot of each file representing a frozen virtual machine;

starting the snapshot of each virtual machine;

mapping files of the snapshot of each virtual machine;

creating a snapshot of the files of the base computer, including each file representing a virtual machine;

mapping the files of the snapshot; and performing a full backup of the base computer, including each file representing a virtual machine.

11. The method of claim 10 further comprising:
subsequently using file mapping information to restore at least one file of at least one virtual machine.

12. At least one computer readable medium containing a computer program product for backing up virtual machines running on a base computer, the computer program product comprising:
program code for freezing at least one virtual machine running on the base computer;
program code for creating a snapshot of at least one file representing at least one frozen virtual machine;
program code for starting at least one snapshot of at least one virtual machine;
program code for mapping files of at least one snapshot of at least one virtual machine; and
program code for using file mapping information to backup the files of at least one virtual machine.

13. The computer program product of claim 12 further comprising:
program code for backing up files of the base computer.

14. The computer program product of claim 12 wherein the program code for using file mapping information to backup the files of at least one virtual machine further comprises:
program code for using file mapping information to reconstruct the files of at least one virtual machine at a base machine level; and
program code for backing up the reconstructed files.

15. The computer program product of claim 12 further comprising:
program code for subsequently restoring at least one file of at least one virtual machine.

16. At least one computer readable medium containing a computer program product for incrementally backing up virtual machines running on a base computer, the program product comprising:
program code for freezing all virtual machines running on the base computer;
program code for creating a snapshot of each file representing a frozen virtual machine;
program code for starting the snapshot of each virtual machine;
program code for mapping files of the snapshot of each virtual machine;
program code for creating a snapshot of the files of the base computer, including each file representing a virtual machine;
program code for mapping the files of the snapshot; and
program code for backing up blocks of files of the base computer that have changed since a last full backup of the base computer, including changed blocks of any file that represents a virtual machine running on the base computer.

17. The computer program product of claim 16 further comprising:
program code for subsequently using file mapping information to restore at least one file of at least one virtual machine.

18. The computer program product of claim 16 further comprising program code for performing the following steps prior to backing up blocks of files of the base computer that have changed since a last full backup of the base computer:
freezing all virtual machines running on the base computer;
creating a snapshot of each file representing a frozen virtual machine;
starting the snapshot of each virtual machine;
mapping files of the snapshot of each virtual machine;
creating a snapshot of the files of the base computer, including each file representing a virtual machine;
mapping the files of the snapshot; and
performing a full backup of the base computer, including each file representing a virtual machine.

19. The computer program product of claim 18 further comprising:
program code for subsequently using file mapping information to restore at least one file of at least one virtual machine.

20. A computer system, in computer memory, for backing up virtual machines running on a base computer, the computer system comprising:
a software portion configured to freeze at least one virtual machine running on the base computer;
a software portion configured to create a snapshot of at least one file representing at least one frozen virtual machine;
a software portion configured to start at least one snapshot of at least one virtual machine;
a software portion configured to map files of at least one snapshot of at least one virtual machine;
a software portion configured to use file mapping information to backup the files of at least one virtual machine;
a software portion configured to backup files of the base computer; and
a software portion configured to restore at least one file of at least one virtual machine.

* * * * *